2,814,621
NEW AMINE SALTS OF PENICILLIN

William B. Wheatley, Syracuse, N. Y., assignor to Bristol Laboratories Inc., Syracuse, N. Y., a corporation of New York No Drawing. Application February 9, 1954, Serial No. 409,273

6 Claims. (Cl. 260—239.1)

The present invention relates to new amine salts of penicillin.

This application is a continuation-in-part of my prior copending application Serial No. 226,543, filed May 15, 1951 and now abandoned.

The new amine salts of the present invention have the following general formula:

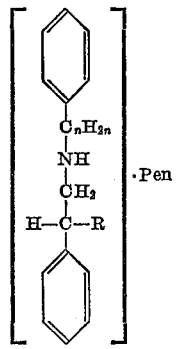

wherein $n$ is an integer from 1 to 3; R is a member of the class consisting of hydrogen, hydroxy, and lower alkyl, and Pen designates an acid penicillin radical or an active moiety thereof, capable of forming an addition salt with the above amine.

The amine salts of penicillin of this invention are capable of exerting a prolonged repository antibiotic action.

A more comprehensive understanding of this invention is obtained by reference to the following examples.

*Example 1.*—α-(*Benzylaminomethyl*) benzyl alcohol salt of penicillin

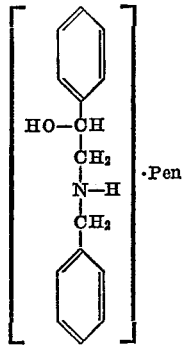

44.7 g. of crude potassium penicillin was suspended in one liter of chilled ether and 215 ml. of cold 8.5% phosphoric acid was added in three portions, with vigorous shaking after each addition. The ether layer was separated and added rapidly to a cold solution of 22.7 g. of α-(benzylaminomethyl) benzyl alcohol in 800 ml. of ether. A brown gum precipitated at once and upon the addition of 5 ml. of water and scratching this gum crystallized. The yellow-white solid was collected by suction filtration and dried in vacuo over phosphorous pentoxide. The dry solid was dissolved in a minimum amount of absolute methanol at room temperature and isopropyl ether added to the point of cloudiness. After cooling the crystalline solid was collected by filtration and dried in vacuo over phosphorous pentoxide.

Weight: 46.9 g. (82.5%); M. P. 144.5–145° C. (with decomposition).

Analysis: Calculated for $C_{31}H_{35}N_3O_5S$: C, 66.3; H, 6.28. Found: C, 66.3; H, 6.48.

*Example 2.*—α-(β-*Phenylethylaminomethyl*) benzyl alcohol salt of penicillin

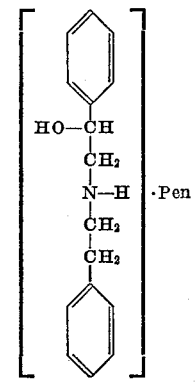

43.8 g. of crude potassium penicillin was suspended in one liter of chilled ether and 215 ml. of cold 8.5% phosphoric acid was added in three portions, with vigorous shaking after each addition. The ether layer was separated and added rapidly to a cold solution of 21.9 g. of α-(β-phenylethylaminomethyl) benzyl alcohol in 800 ml. of ether. A brown gum precipitated at once and upon the addition of 5 ml. of water and scratching this gum crystallized. The yellow-white solid was collected by suction filtration and dried in vacuo over phosphorous pentoxide. The dry solid was dissolved in a minimum amount of absolute methanol at room temperature and isopropyl ether added to the point of cloudiness. After cooling the crystalline solid was collected by filtration and dried in vacuo over phosphorous pentoxide.

*Example 3.*—α-(β-*Phenylisopropylaminomethyl*) benzyl alcohol salt of penicillin

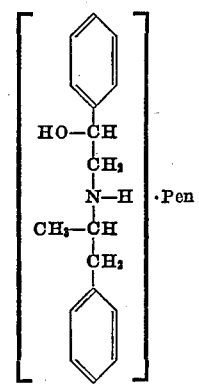

44 g. of crude potassium penicillin was suspended in one liter of chilled ether and 215 ml. of cold 8.5% phosphoric acid was added in three portions, with vigorous shaking after each addition. The ether layer was separated and added rapidly to a cold solution of 22.3 g. of α-(β-phenylisopropylaminomethyl) benzyl alcohol in 800 ml. of ether. A brown gum precipitated at once and upon the addition of 5 ml. of water and scratching this gum crystallized. The yellow-white solid was collected by suction filtration and dried in vacuo over phosphorous pentoxide. The dry solid was dissolved in a minimum amount of absolute methanol at room temperature and isopropyl ether added to the point of cloudiness. After cooling, the crystalline solid was collected by filtration and dried in vacuo over phosphorous pentoxide.

*Example 4.—Di-(β-phenylethyl)-amine salt of penicillin*

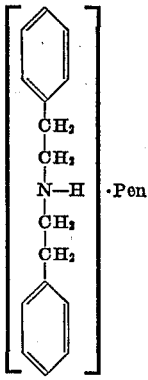

44.7 g. of crude potassium penicillin was suspended in one liter of chilled ether and 215 ml. of cold 8.5% phosphoric acid was added in three portions, with vigorous shaking after each addition. The ether layer was separated and added rapidly to a cold solution of 22.8 g. of di-(β-phenylethyl)-amine in 800 ml. of ether. A brown gum precipitated at once and upon the addition of 5 ml. of water and scratching this gum crystallized. The yellow-white solid was collected by suction filtration and dried in vacuo over phosphorous pentoxide. The dry solid was dissolved in a minimum amount of absolute methanol at room temperature and isopropyl ether added to the point of cloudiness. After cooling, the crystalline solid was collected by filtration and dried in vacuo over phosphorous pentoxide.

*Example 5.—N - benzyl - beta - phenethylamine salt of penicillin*

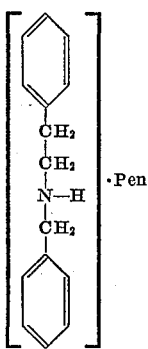

A solution of N-benzyl-beta-phenethylamine hydrochloride (28.9 grams) in a warm mixture of 200 ml. methanol and 100 ml. water was added in a slow stream to a stirred solution of potassium penicillin G (55.8 grams) in 200 ml. water. Water (600 ml.) was added rapidly and the mixture stirred for six hours at room temperature. The N - benzyl-beta-phenethylamine benzylpenicillin which precipitated in colorless crystalline form was collected by filtration, washed with water, dried in air and found to weigh 63.0 grams, to melt at about 144°–146° C. with decomposition and to have a potency of about 1080 units/mgm. and to be soluble in water at room temperature to the extent of about 1030 units/ml. This crystalline product may be recrystallized by dissolving in methanol and reprecipitating by dilution with water. Anal. Cal'd for $C_{31}H_{35}N_3O_4S$: C, 68.27; H, 6.47. Found: C, 68.2; H, 6.55.

N - benzyl - beta-phenethylamine penicillin G upon a single intramuscular injection in man of 300,000 units in aqueous suspension on the average gives blood levels of penicillin of at least 0.03 u./ml. for ninety-six hours, whereas blood levels with comparable doses of procaine penicillin G or dibenzylamine penicillin G drop below 0.03 u./ml. in less than 48 and 72 hours respectively. Compared with N,N'-dibenzylethylenediamine dipenicillin G, N-benzyl-beta-phenethylamine penicillin G in equal doses of 600,000 units produces higher blood levels than the former up to 48 hours after injection and then produces at least equally high blood levels of at least 0.03 u./ml. from the 48th to the 120th hour after injection.

The products of the present invention are obtained by reaction of penicillin acid with the appropriate amine, e. g. N - benzyl-beta-phenethylamine, in a water-immiscible organic solvent such as ether or by the metathetical reaction in water of a water-soluble penicillin salt and a water-soluble salt of the appropriate amine, e. g. N-benzyl-beta-phenethylamine hydrochloride.

While the present invention has been described with particular reference to the salts of penicillin G it will be understood that the salts of other penicillins are also included within the scope of this invention. For instance, penicillins such as the penicillins F, G, X, dihydro F, O, BT, and K and mixtures of two or more such penicillins, particularly such mixtures containing at least 85% of penicillin G, are included within the scope of this invention.

It will be understood that the reaction can be carried out in water-immiscible organic solvents other than ether. Examples of such solvents are butanol, amyl acetate, methyl amyl acetate, isopropyl ether, mesityl oxide, methyl isobutyl ketone, methylene dichloride, ethylene dichloride and chloroform. Recovery of the product may be increased by evaporating the solvent in vacuo at low temperatures.

It will be understood also that the solution in an organic solvent of the free amine may be prepared in the organic solvent by the use of caustic to liberate the free amine from an organic-solvent soluble or water-soluble salt such as the hydrochloride, phosphate, nitrate, hydrobromide, sulfate, citrate, acetate and tartrate.

The penicillin salts of the present invention, whether alone or in combination with other therapeutic agents, are used as a simple powder, as tablets, as troches, as lozenges or in capsules. Aqueous suspensions are prepared in advance or in situ when the stability of other added agents (e. g. potassium benzylpenicillin) so requires, and are a highly acceptable oral dosage form. A particularly useful oral dosage form is a suspension in a palatable, acceptable edible oil; coconut oil is preferred, particularly when free of tristearin or having a setting point less than 60° F. and gelled with an aluminum stearate (cf. U. S. Patent 2,507,193). The salts of the present invention are admixed with suitable buffers or pharmaceutical additives, preservatives, diluents, binders, lubricants, masticatory substances, colors, flavors, suspending agents, dispersing agents, resuspending agents, and stabilizing agents as desired.

The penicillin salts of the present invention, alone or in combination with other therapeutic agents, are presented for parenteral use as a suspension in an injectable oil (e. g. peanut oil), as a suspension in a gelled injectable oil (e. g. peanut oil gelled with 2% aluminum monostearate), as an aqueous suspension or as a powder to which a sterile, aqueous diluent is added before use to generate an injectable suspension. These aqueous suspensions often advantageously contain non-toxic suspending or dispersing agents, such as sodium carboxymethylcellulose, methylcellulose, polyvinyl alcohol, polyvinylpyrrolidone, gum tragacanth, gelatin, pectin, alginates, dextrans, gum karaya, lecithin, Spans, Tweens, Amerchols, inositolphosphoric acids and their non-toxic salts (e. g. sodium phytate), glyceryl monostearate, Kreelon CD, polyoxyalkylene-sorbitols, no more than 2.0 percent of an injectable oil such as peanut oil and condensation products, having molecular weights greater than 1500, of ethylene oxide with a condensation product of propylene oxide with propylene glycol (e. g. Pluronic F 68). On occasion, it is advantageous to actually coat the particles of penicillin salt, at least in part, with one of these agents, e. g. lecithin.

If desired, buffering agents are added such as sodium citrate or sodium phosphates, as when the penicillin salts of this invention are used with an alkali metal salt of penicillin. When appropriate, as when used with excess added free base of the amine used to form the salt of penicillin, the suspensions may be buffered by the addition of free acids, e. g. citric acid, phosphoric acid. If desired, a stabilizing agent is added, such as sodium hexametaphosphate, hexamethylenetetramine or sodium phytate. Small amounts of preservative are often used, e. g. phenol, cresol, or alkyl esters of p-hydroxybenzoic acid. Useful variations in the properties of the penicillin salts of the present invention are obtained by altering particle size or shape, as by varying procedures of crystallization or, most easily, by mechanical means such as grinding, hammer-milling, pulverizing, or micronizing.

When desired for specific purposes, administered by appropriate routes, and rendered pharmaceutically compatible as described in the art for other salts of penicillin, there may be admixed with the penicillin salts of the present invention, and particularly those prepared for oral use, one or more of various other medicaments such as antihistamines, sulfa drugs (e. g. sulfadiazine, sulfamerazine, sulfamethazine, sulfacetamide, sulfanilamide, sulfapyridine, sulfathiaxole, sulfapyrazine, sulfaguanidine, sulfathalidine, sulfasuxidine, sulfisoxazole, sulfamylon, phthalylsulfacetamide, N'-3,4-dimethylbenzoylsulfanilamide, benzylsulfanilamide, and N'-(2-quinoxalyl)-sulfanilamide), vitamins (e. g. vitamins A, B$_1$, B$_2$, B$_6$, B$_{12}$, and members of that family, folic acid and members of that family, vitamins C, D$_2$, D$_3$, and E), lipotropic agents, stimulants (e. g. caffeine, amphetamines), analgesics (e. g. aspirin, salicylamide, sodium gentisate, p-acetylaminophenol, phenacetin, codeine), laxatives (e. g. phenolphthalein), sedatives (e. g. barbiturates, bromides), other salts of penicillin (e. g. potassium penicillin G, procaine penicillin G, 1-ephenamine penicillin G, dibenzylamine penicillin G, N,N'-dibenzylethylenediamine dipenicillin G and other salts disclosed by U. S. Patent 2,627,491; these combinations are particularly useful to enable variation of the pattern of blood levels obtained), other antibiotic agents (e. g. streptomycin, dihydrostreptomycin, neomycin, bacitracin, polymixin, tyrothricin, erythromycin, chlorotetracycline, oxytetracycline, tetracycline, chloramphenicol, magnamycin); in some cases such combinations attack a wider range of organisms or show synergistic efficacy or provide decreased toxicity with equal efficacy; and spreading agents (e. g. hyaluronidase).

Multiple combinations of such added agents are often useful, e. g. sulfadiazine and sulfamerazine to provide equal efficacy and reduced toxicity; substantially equal amounts of a non-toxic acid addition salt of streptomycin (sulfate; levo pimaric -6,8a-cis-endosuccinate) and a non-toxic acid addition salt of dihydrostreptomycin (sulfate; sulfate iodide) to provide equal efficacy and reduced toxicity; aspirin, phenacetin and caffeine; multiple vitamins.

Further information which is readily applied to formulations and combinations of the penicillin salts of the present invention is to be found in U. S. Patents 2,602,038, 2,608,509, 2,608,507, 2,619,447, 2,515,898, 2,533,066, 2,507,193, and 2,578,651.

I claim:

1. A salt of penicillin and an amine, said amine having the following formula

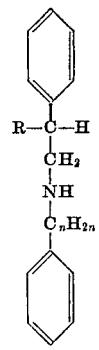

where $C_nH_{2n}$ represents an alkylene radical and $n$ is an integer from 1 to 3 inclusive and R represents a member selected from the group consisting of hydrogen and hydroxyl.

2. A salt of penicillin G and α-(benzylaminomethyl) benzyl alcohol.

3. A salt of penicillin G and α-(β-phenylethylaminomethyl) benzyl alcohol.

4. A salt of penicillin G and α-(β-phenylisopropylaminomethyl) benzyl alcohol.

5. A salt of penicillin G and di-(β-phenylethyl)-amine.

6. A salt of penicillin G and N-benzyl-beta-phenethylamine.

References Cited in the file of this patent

UNITED STATES PATENTS

| | | |
|---|---|---|
| 2,493,625 | Goldberg et al. | Jan. 3, 1950 |
| 2,527,810 | Goldberg et al. | Oct. 31, 1950 |
| 2,585,432 | Buckwalter | Feb. 12, 1952 |
| 2,627,491 | Szabo et al. | Feb. 3, 1953 |